(12) United States Patent
Kasher et al.

(10) Patent No.: US 10,790,895 B2
(45) Date of Patent: Sep. 29, 2020

(54) ANTENNA ARRAY WEIGHT VECTOR SELECTION TECHNIQUES FOR 60 GHZ MIMO COMMUNICATIONS

(71) Applicant: INTEL IP CORPORATION, Santa Clara, CA (US)

(72) Inventors: Assaf Kasher, Haifa (IL); Michael Genossar, Modin Maccabim Reut (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/025,814

(22) Filed: Jul. 2, 2018

(65) Prior Publication Data

US 2019/0173557 A1 Jun. 6, 2019

Related U.S. Application Data

(63) Continuation of application No. 14/975,602, filed on Dec. 18, 2015, now Pat. No. 10,014,924.

(60) Provisional application No. 62/200,021, filed on Aug. 1, 2015.

(51) Int. Cl.
*H04B 7/06* (2006.01)
*H04B 7/0413* (2017.01)

(52) U.S. Cl.
CPC ......... *H04B 7/0691* (2013.01); *H04B 7/0413* (2013.01); *H04B 7/0617* (2013.01); *H04B 7/0689* (2013.01)

(58) Field of Classification Search
CPC .. H04B 7/0691; H04B 7/0413; H04B 7/0617; H04B 7/0689; H04B 7/0695; H04B 7/088; H04B 7/0452; H04B 7/061; H05B 7/063
See application file for complete search history.

(56) References Cited

U.S. PATENT DOCUMENTS

2018/0109303 A1* 4/2018 Yoo ...................... H04B 7/0695

OTHER PUBLICATIONS

Nitsche et al., IEEE 802.11ad: Directional 60 GHz Communication for Multi-Gigabit-per-Second Wi-Fi, Dec. 2014, pp. 132-141.*
Ho et al. "MIMO Beamforming in Millimeter-Wave Directional Wi-Fi", Apr. 2014, pp. 1-10.*

* cited by examiner

*Primary Examiner* — Sophia Vlahos

(57) ABSTRACT

Various embodiments may be generally directed to antenna array weight vector selection techniques for 60 GHz multiple-input multiple-output (MIMO) communications. In some embodiments, using one or more such techniques, a 60 GHz-capable transmitting device may select respective antenna array weight vectors for two or more transmit antenna arrays, and a 60 GHz-capable receiving device may select respective antenna array weight vectors for two or more receive antenna arrays. In various embodiments, in order to obtain information for use in selecting such antenna array weight vectors, the transmitter and receiver may utilize one or more existing beamforming training algorithms defined for 60 GHz single-input single-output (SISO) communications. In some embodiments, for example, the transmitter and receiver may utilize one or more beamforming training algorithms defined in IEEE 802.11ad-2012. The embodiments are not limited in this context.

24 Claims, 8 Drawing Sheets

*FIG. 6*

Storage Medium 600

*Computer Executable Instructions for 400*

*Computer Executable Instructions for 500*

ANTENNA ARRAY WEIGHT VECTOR SELECTION TECHNIQUES FOR 60 GHZ MIMO COMMUNICATIONS

RELATED CASE

This application is a continuation of, claims the benefit of and priority to previously filed U.S. patent application Ser. No. 14/975,602 filed Dec. 18, 2015, which claims priority to U.S. Provisional Patent Application No. 62/200,021, filed Aug. 1, 2015, both of which are hereby incorporated by reference in their entirety.

TECHNICAL FIELD

Embodiments described herein generally relate to wireless communications between devices in wireless networks.

BACKGROUND

The 60 GHz wireless communication frequency band offers substantial promise for use in accommodating the ever-growing data-rate demands of wireless communications devices and their users. The 60 GHz band contains a large amount of available bandwidth, the physical properties of signals with frequencies in the 60 GHz band render them well-suited for use in directional transmission and reception in conjunction with the application of spatial multiplexing techniques. 60 GHz-capable devices may perform directional transmission and reception using antenna arrays, such as steerable phased antenna arrays. In a simple example, a 60 GHz-capable transmitter may transmit signals using one transmit antenna array, and a 60 GHz-capable receiver may receive those signals using one receive antenna array. In order to optimize the quality with which the 60 GHz-capable receiver is able to receive the signals from the 60 GHz-capable transmitter, the two devices may engage in a beamforming training procedure. Using the beamforming training procedure, the 60 GHz-capable transmitter may identify an optimal antenna array weight vector (AWV) for its transmit antenna array, and the 60 GHz-capable receiver may identify an optimal AWV for its receive antenna array.

BRIEF DESCRIPTION OF THE DRAWINGS

FIG. 6 illustrates an embodiment of a storage medium.

DETAILED DESCRIPTION

Figure 1:
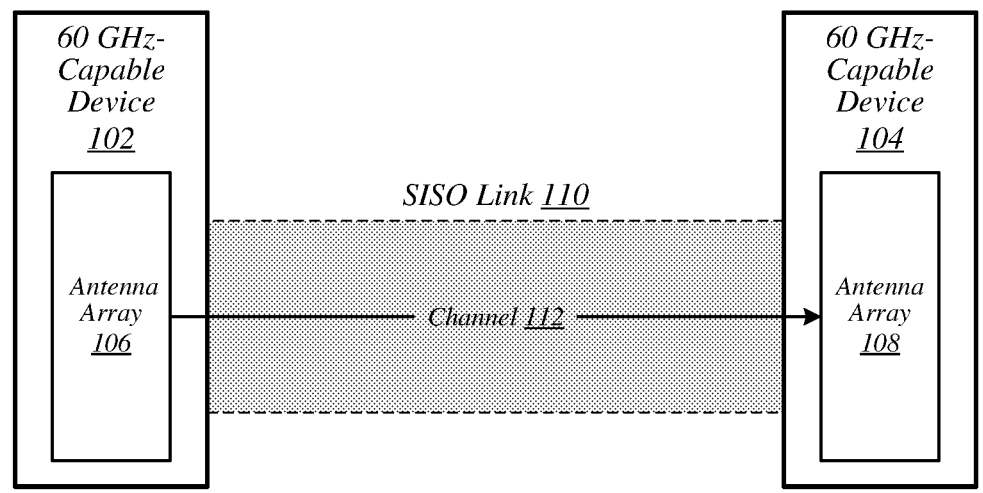
FIG. 1 illustrates an embodiment of a first operating environment.

Various embodiments may be generally directed to antenna array weight vector selection techniques for 60 GHz multiple-input multiple-output (MIMO) communications. In some embodiments, using one or more such techniques, a 60 GHz-capable transmitting device may select respective antenna array weight vectors for two or more transmit antenna arrays, and a 60 GHz-capable receiving device may select respective antenna array weight vectors for two or more receive antenna arrays. In various embodiments, in order to obtain information for use in selecting such antenna array weight vectors, the transmitter and receiver may utilize one or more existing beamforming training algorithms defined for 60 GHz single-input single-output (SISO) communications. In some embodiments, for example, the transmitter and receiver may utilize one or more beamforming training algorithms defined in IEEE 802.11ad-2012. The embodiments are not limited in this context.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards, such as the IEEE 802.11ay standard that is currently under development. Some embodiments may involve wireless communications performed according to one or more millimeter-wave (mmWave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band or any nearby unlicensed band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100, in which a 60 GHz-capable device 102 may communicate with a 60 GHz-capable device 104. In some embodiments, 60 GHz-capable devices 102 and 104 may comprise wireless communication devices in a wireless network that utilizes wireless channel frequencies of the 60 GHz band. In various embodiments, 60 GHz-capable devices 102 and 104 may communicate with each other according to one or more standards for 60 GHz wireless communications. For example, in some embodiments, 60 GHz-capable devices 102 and 104 may communicate with each other according to one or more protocols and/or procedures defined in IEEE 802.11ad-2012, and/or its predecessors, revisions, progeny, and/or variants. In various such embodiments, 60 GHz-capable devices 102 and 104 may comprise 60 GHz-capable stations (STAs) such as Directional Multi-Gigabit (DMG) stations (STAs). In some such embodiments, one of 60 GHz-capable devices 102 and 104 may operate as a personal basic service set (PBSS) control point/access point (PCP/AP). In some embodiments, 60 GHz-capable devices 102 and 104 may communicate with each other according to one or more protocols and/or procedures that may be defined in the IEEE 802.11ay standard that is currently under development. The embodiments are not limited to these examples.

In operating environment 100, 60 GHz-capable device 102 comprises an antenna array 106, and 60 GHz-capable device 104 comprises an antenna array 108. In various embodiments, antenna arrays 106 and 108 may comprise steerable phased antenna arrays. In some embodiments, 60 GHz-capable device 102 may send data to 60 GHz-capable device 104 via a single-input single-output (SISO) link 110. In various embodiments, sending data over SISO link 110 may involve transmission over a channel 112 between antenna array 106 and antenna array 108. In some embodiments, in order to transmit over channel 112, 60 GHz-capable device 102 may transmit signals using antenna array 106. In various embodiments, in order to receive over channel 112, 60 GHz-capable device 104 may receive those signals using antenna array 108. In some embodiments, in order to optimize the quality with which 60 GHz-capable device 104 is able to receive from 60 GHz-capable device 102 over channel 112 (and thus over SISO link 110), 60 GHz-capable devices 102 and 104 may engage in a beamforming training procedure. In various embodiments, using the beamforming training procedure, 60 GHz-capable device 102 may identify an optimal AWV for use in transmission from antenna array 106, and 60 GHz-capable device 104 may identify an optimal AWV for use in reception by antenna array 108. In some embodiments, the beamforming training procedure may involve the use of one or more IEEE 802.11ad beamforming training algorithms, such as transmit sector sweeps (TXSSs), receive sector sweeps (RXSSs), and/or beam refinement phases (BRPs). The embodiments are not limited to these examples.

Figure 2:
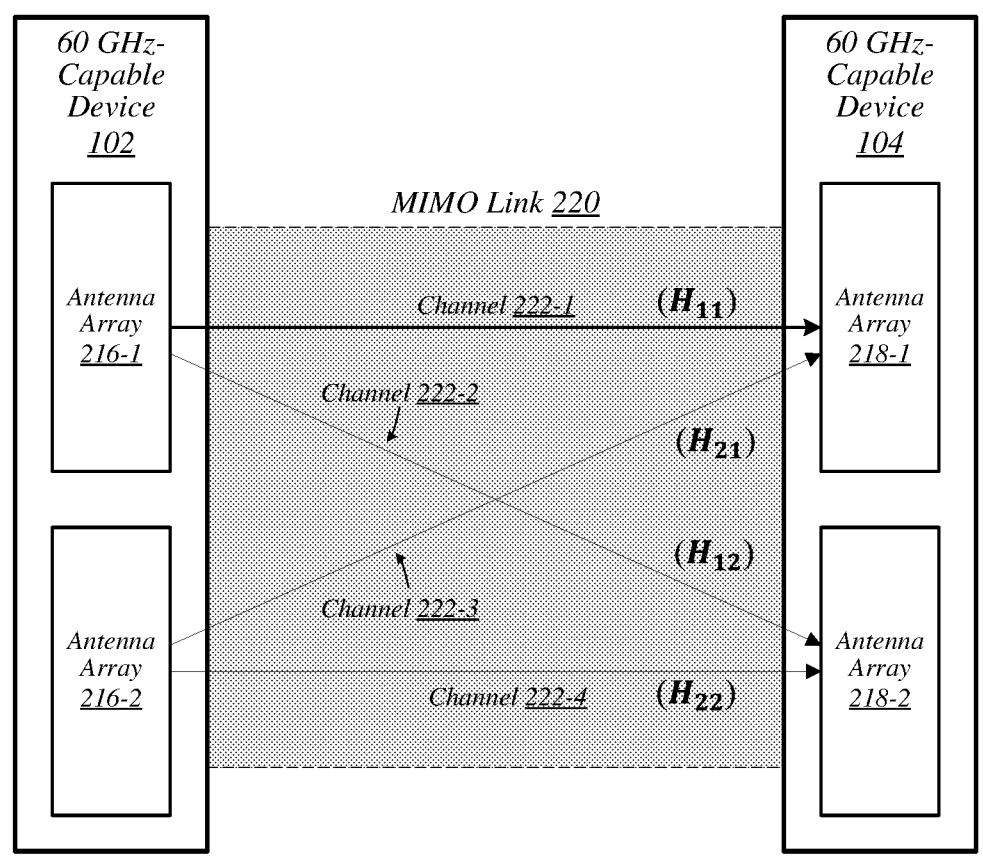
FIG. 2 illustrates an embodiment of a second operating environment.

FIG. 2 illustrates an example of an operating environment 200 that may be representative of various embodiments. In operating environment 200, 60 GHz-capable device 102 comprises antenna arrays 216-1 and 216-2, and 60 GHz-capable device 104 comprises antenna arrays 218-1 and 218-2, some or all of which may comprise steerable phased antenna arrays. In some embodiments, one or more of antenna arrays 216-1, 216-2, 218-1, and 218-2 may possess gain control features. In various embodiments, the presence of multiple antenna arrays at both 60 GHz-capable device 102 and 60 GHz-capable device 104 may enable 60 GHz-capable device 102 to send data to 60 GHz-capable device 104 via a multiple-input multiple-output (MIMO) link 220. In some embodiments, sending data over MIMO link 220 may involve transmission over multiple channels, each corresponding to a different transmit (TX) antenna array/receive (RX) antenna array pair. In operating environment 200, sending data from 60 GHz-capable device 102 to 60 GHz-capable device 104 over MIMO link 220 may involve transmissions over a channel 222-1 from antenna array 216-1 to antenna array 218-1, a channel 222-2 from antenna array 216-1 to antenna array 218-2, a channel 222-3 from antenna array 216-2 to antenna array 218-1, and a channel 222-4 from antenna array 216-2 to antenna array 218-2.

In various embodiments, in order to obtain information based on which to configure their antenna arrays for communication over MIMO link 220, 60 GHz-capable devices 102 and 104 may engage in one or more beamforming training procedures. In some embodiments, each such beamforming training procedure may involve the use of one or more IEEE 802.11ad beamforming training algorithms, such as TXSSs, RXSSs, and/or BRPs. In various embodiments, through the use of the one or more beamforming training procedures, 60 GHz-capable devices 102 and 104 may calculate best respective transmit and receive AWVs for each of channels 222-1, 222-2, 222-3, and 222-4. In some such embodiments, the best transmit and receive AWVs may be determined via performance of a TXSS for each TX antenna array and an RXSS for each RX antenna array. In various embodiments, orthogonal training sequences may be used to enable concurrent training of all four of channels 222-1, 222-2, 222-3, and 222-4 during a BRP. In some such embodiments, modified BRP frames may be utilized that feature a modified feedback format that allows concurrent responses to multiple TX training sequences. The embodiments are not limited in this context.

In the interest of clarity, the following notations shall be employed hereinafter in reference to the various elements of operating environment 200 and the discussion thereof:

$N_{T1}$ and $N_{T2}$ denote respective numbers of antenna elements comprised in antenna arrays 216-1 and 216-2 at 60 GHz-capable device 102.

$N_{R1}$ and $N_{R2}$ denote respective numbers of antenna elements comprised in antenna arrays 218-1 and 218-2 at 60 GHz-capable device 104.

$H_{11}$, $H_{12}$, $H_{21}$, and $H_{22}$ denote channels 222-1, 222-2, 222-3, and 222-4, respectively.

$v_{11}$ and $v_{12}$ denote calculated best transmit AWVs with respect to transmissions by antenna array 216-1 over $H_{11}$ and $H_{12}$, respectively.

$v_{21}$ and $v_{22}$ denote calculated best transmit AWVs with respect to transmissions by antenna array 216-2 over $H_{21}$ and $H_{22}$, respectively.

$w_{11}$ and $w_{21}$ denote calculated best receive AWVs with respect to reception by antenna array 218-1 of transmissions over $H_{11}$ and $H_{21}$, respectively.

$w_{12}$ and $w_{22}$ denote calculated best receive AWVs with respect to reception by antenna array 218-2 of transmissions over $H_{12}$ and $H_{22}$, respectively.

$(v_1, v_2)$ represents an AWV pair comprising the actual AWVs $v_1$ and $v_2$ that 60 GHz-capable device 102 applies at antenna arrays 216-1 and 216-2, respectively, in conjunction with transmission to 60 GHz-capable device 104 over MIMO link 220.

$(w_1, w_2)$ represents an AWV pair comprising the actual AWVs $w_1$ and $w_2$ that 60 GHz-capable device 104 applies at antenna arrays 218-1 and 218-2, respectively, in conjunction with reception from 60 GHz-capable device 102 over MIMO link 220.

In operating environment 200, channels $H_{11}$, $H_{12}$, $H_{21}$, and $H_{22}$ may comprise tensor channels, where for each time tap n, the element $H_{ij}(k, l, n)$ represents the $n^{th}$ tap of the channel $H_{ij}$ between the $l^{th}$ antenna element at the transmitter and the $k^{th}$ antenna element at the receiver. The tensor channel may not be known at the transmitter or the receiver, but it may be possible to measure it using a packet with $N_{T_{max}} \times N_{R_{max}}$ TRN fields, where $N_{T_{max}} = \max(N_{T1}, N_{T2})$ and $N_{R_{max}} = \max(N_{R1}, N_{R2})$.

In various embodiments, after identifying $v_{11}$, $v_{12}$, $v_{21}$, $v_{22}$, $w_{11}$, $w_{21}$, $w_{12}$, and $w_{22}$, 60 GHz-capable devices 102 and 104 may use those parameters to select $(v_1, v_2)$ and $(w_1, w_2)$. According to one technique, 60 GHz-capable device 102 may select $(v_1, v_2)$ from among $(v_{11}, v_{22})$ and $(v_{12}, v_{21})$, and 60 GHz-capable device 104 may select $(w_1, w_2)$ from among $(w_{11}, w_{22})$ and $(w_{21}, w_{12})$. In some embodiments, 60 GHz-capable devices 102 and 104 may perform these selections based on a comparison of the link quality yielded by the use of $(v_{11}, v_{22}, w_{11}, w_{22})$ with the link quality yielded by the use of $(v_{12}, v_{21}, w_{21}, w_{12})$. If $(v_{11}, v_{22}, w_{11}, w_{22})$ yields better performance, 60 GHz-capable device 102 may select $(v_1, v_2)$ as $(v_{11}, v_{22})$, and 60 GHz-capable device 104 may select $(w_1, w_2)$ as $(w_{11}, w_{22})$. If $(v_{12}, v_{21}, w_{21}, w_{12})$ yields better performance, 60 GHz-capable device 102 may select $(v_1, v_2)$ as $(v_{12}, v_{21})$, and 60 GHz-capable device 104 may select $(w_1, w_2)$ as $(w_{21}, w_{12})$. The embodiments are not limited in this context.

According to a second technique, 60 GHz-capable devices 102 and 104 may select an AWV pair and then optimize channel capacity based on nulling interference from other transmissions. In various embodiments, from among the pairs $(v_{11}, v_{12})$, $(v_{21}, v_{22})$, $(w_{11}, w_{21})$, and $(w_{12}, w_{22})$, a pair may be found for which the inner product $|u_1^H u_2|$ is minimal. The value of $\alpha$ may then be incremented from 0 to 1—in steps of 0.1, for example—and for each step, a putative AWV $u_0$ may be calculated according to Equation 1 as follows:

$$u_0 = u_1 - \alpha \frac{u_1^H u_2}{u_2^H u_2} u_2 \qquad (1)$$

Channel capacity may then be calculated using $(v_{11}, v_{22}, w_{11}, w_{22})$, with $u_0$ replacing $v_{11}$, $v_{22}$, $w_{11}$, or $w_{22}$ depending on the selected pair. The capacity at each stage may be calculated according to Equations (2)-(4) as follows:

$$H_{ij} = w_{ij} v_{ij}^H \qquad (2)$$

$$H = \begin{pmatrix} w_1^H H_{11} v_1 & w_1^H H_{21} v_2 \\ w_2^H H_{12} v_1 & w_2^H H_{22} v_2 \end{pmatrix} \qquad (3)$$

$$\text{capacity} = \log \det(I + SNR \times H^H H) \qquad (4)$$

Other optimization criteria are also possible, such as minimization of trace$((H^H H)^{-1})$, the minimum of the total SC zero forcing mean square error (MSE), or minimization of max(diag$((H^H H)^{-1})$), minimization of the worst stream MSE. The embodiments are not limited to these examples.

According to a third technique, an iterative algorithm may be used that is based on iteratively maximizing the capacity of a flat fading channel based on the best channel from the selected set of AWVs. Using BRP-based beamforming between each TX and RX antenna array, the transmitter and receiver may identify receive antenna weights $w_{R11}$, $w_{R12}$, $w_{R21}$, and $w_{R22}$ and transmit antenna weights $w_{T11}$, $w_{T12}$, $w_{T21}$, and $w_{T22}$ for the respective channels $H_{11}$, $H_{12}$, $H_{21}$, and $H_{22}$. This may be equivalent to an assumption that all of the channels are flat and rank one, such that $H_{ij} = w_{Rij} w_{Tij}$. Four AWVs can be modified—$w_{T1}$ and $w_{T2}$ at the transmitter, and $w_{R1}$ and $w_{R2}$ at the receiver. A MIMO matrix may be generated by applying these weights to the transmit and receive sides, according to Equation (5) as follows:

$$H = \begin{pmatrix} w_{R1}^H H_{11} w_{T1} & w_{R1}^H H_{21} w_{T2} \\ w_{R2}^H H_{12} w_{T1} & w_{R2}^H H_{22} w_{T2} \end{pmatrix} \qquad (5)$$

Channel capacity is given by equation (6) as follows:

$$\text{capacity} = \log \det(I + (HH^H) \times SNR) \qquad (6)$$

If SNR is relatively high, an assumption may be made in view of Equation (6) that channel capacity will be substantially maximized when det$(HH^H)$ is maximized. It is worthy of note that det$(HH^H)$=det$(H)$ det$(H^H)$=|det$(H)|^2$. det$(H)$ may be calculated according to Equation (7) as follows:

$$\text{Det}(H) = w_{r1}^H H_{11} w_{t1} w_{r2}^H H_{22} w_{t2} - w_{r2}^H H_{12} w_{t1} w_{r1}^H H_{21} w_{t2} \qquad (7)$$

Using the identity $u^H A v = (v^H A^H u)^* = v^T A^T u^*$, Equation (7) may be used to obtain Equations (8) and (9) as follows:

$$\det(H) = w_{R1}{}^H H_{11} w_{T1} w_{T2}{}^T H_{22}{}^T w_{R2}{}^* - w_{R1}{}^H H_{21} w_{T2} w_{T1}{}^T H_{12}{}^T w_{R2}{}^* \quad (8)$$

$$\det(H) = w_{T1}{}^T H_{11}{}^T w_{R1}{}^* w_{R2}{}^H H_{22} w_{T2} - w_{T1}{}^T H_{12}{}^T w_{R2}{}^* w_{R1}{}^H H_{21} w_{T2} \quad (9)$$

This suggests an iterative solution maximizing $w_{R1}{}^H A w_{R2}{}^*$ and then maximizing $w_{T1}{}^T B w_{T2}$, where A and B may be defined according to Equations (10) and (11) as follows:

$$A = H_{11} w_{T1} w_{T2}{}^T H_{22}{}^T - H_{21} w_{T2} w_{T1}{}^T H_{12}{}^T \quad (10)$$

$$B = H_{11}{}^T w_{R1}{}^* w_{R2}{}^H H_{22} - H_{12}{}^T w_{R2}{}^* w_{R1}{}^H H_{21} \quad (11)$$

Equations (10) and (11) may be rewritten as Equations (12) and (13) as follows:

$$A = w_{R11} w_{T11}{}^H w_{T1} w_{T2}{}^T w_{T22}{}^* w_{R22}{}^T - w_{R12} w_{T12}{}^H w_{T2} w_{T1}{}^T w_{T2}{}^* w_{R22}{}^T \quad (12)$$

$$B = w_{T11}{}^* w_{R11}{}^T w_{R1}{}^* w_{R2}{}^H w_{R2} w_{T22}{}^H - w_{T21}{}^* w_{R21}{}^T w_{R2}{}^* w_{R1}{}^H w_{R12} w_{T12}{}^H \quad (13)$$

Each iteration of $w_{R1}{}^H A w_{R2}{}^*$ and $w_{T1} B w_{T2}$ can be performed using singular value decomposition (SVD), although other techniques may be utilized. The embodiments are not limited in this context.

Figure 3:
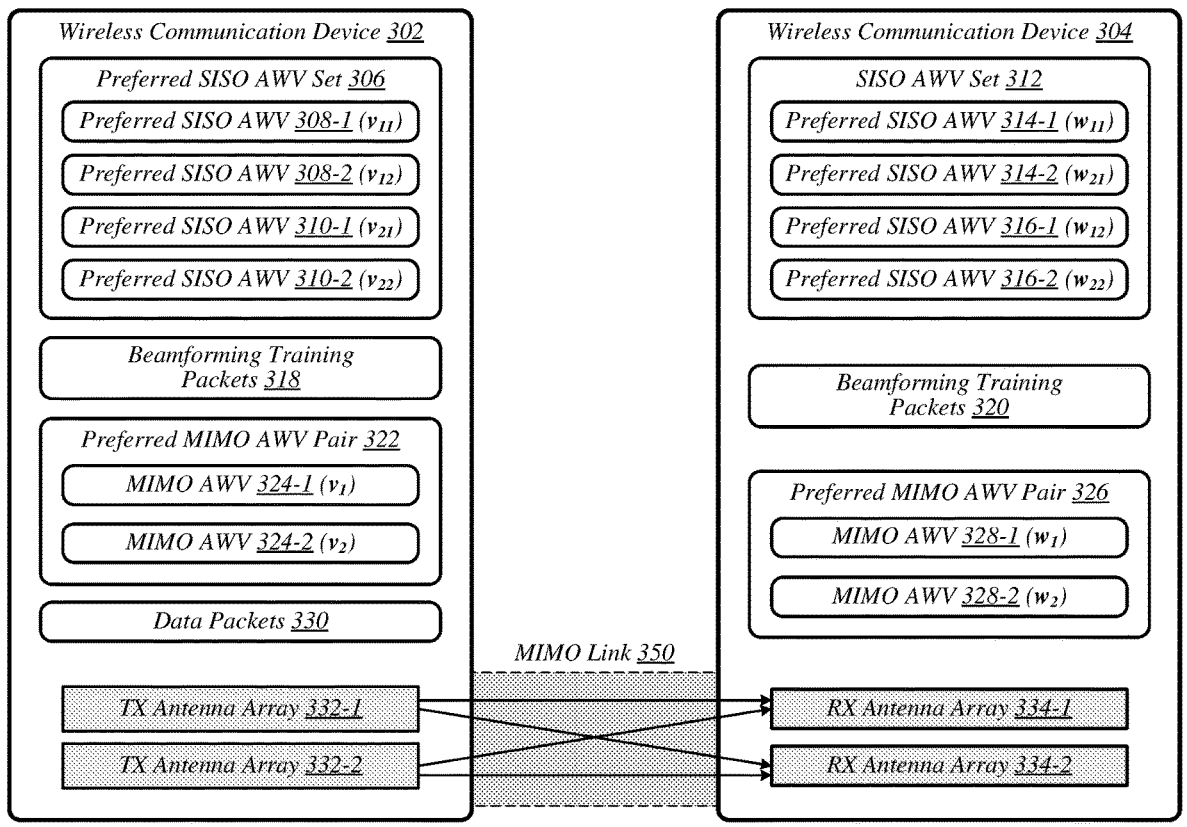
FIG. 3 illustrates an embodiment of a third operating environment.

FIG. 3 illustrates an example of an operating environment 300 that may be representative of the implementation of one or more of the disclosed antenna array weight vector selection techniques according to various embodiments. In operating environment 300, a wireless communication device 302 transmits data packets 330 to a wireless communication device 304. In some embodiments, wireless communication devices 302 and 304 may be the same as—or similar to—60 GHz-capable devices 102 and 104 of FIGS. 1 and 2. In various embodiments, wireless communication device 302 may transmit data packets 330 to wireless communication device 304 using TX antenna arrays 332-1 and 332-2. In some embodiments, TX antenna arrays 332-1 and 332-2 may comprise steerable phased antenna arrays. In various embodiments, TX antenna arrays 332-1 and 332-2 may be the same as—or similar to—antenna arrays 216-1 and 216-2 of FIG. 2. In some embodiments, wireless communication device 302 may comprise a DMG STA. In various embodiments, wireless communication device 302 may operate as a PCP/AP. In some embodiments, wireless communication device 304 may receive data packets 330 from wireless communication device 302 using RX antenna arrays 334-1 and 334-2. In various embodiments, RX antenna arrays 334-1 and 334-2 may comprise steerable phased antenna arrays. In some embodiments, RX antenna arrays 334-1 and 334-2 may be the same as—or similar to—antenna arrays 218-1 and 218-2 of FIG. 2. In various embodiments, wireless communication device 304 may comprise a DMG STA. In some embodiments, wireless communication device 304 may operate as a PCP/AP. The embodiments are not limited in this context.

In various embodiments, wireless communication device 302 may transmit data packets 330 to wireless communication device 304 via a MIMO link 350. In some embodiments, wireless communication device 302 may transmit data packets 330 to wireless communication device 304 via MIMO link 350 using a preferred MIMO AWV pair 322. In various embodiments, preferred MIMO AWV pair 322 may comprise MIMO AWVs 324-1 and 324-2 for application to respective TX antenna arrays 332-1 and 332-2 in conjunction with transmission over MIMO link 350. In some embodiments, wireless communication device 304 may receive data packets 330 from wireless communication device 302 via MIMO link using a preferred MIMO AWV pair 326. In various embodiments, preferred MIMO AWV pair 326 may comprise MIMO AWVs 328-1 and 328-2 for application to respective RX antenna arrays 334-1 and 334-2 in conjunction with reception via MIMO link 350. In some embodiments, MIMO link 350 may comprise a 60 GHz frequency band MIMO link. The embodiments are not limited in this context.

In various embodiments, wireless communication device 302 may determine preferred MIMO AWV pair 322 according to a MIMO AWV selection procedure. In some embodiments, according to the MIMO AWV selection procedure, wireless communication device 302 may select MIMO AWVs 324-1 and 324-2 based on a preferred SISO AWV set 306. In various embodiments, each AWV in preferred SISO AWV set 306 may generally comprise a preferred AWV for a given TX antenna array of wireless communication device 302 with respect to SISO transmission by that TX antenna array to a given RX antenna array of wireless communication device 304. In some embodiments, preferred SISO AWV set 306 may comprise preferred SISO AWVs 308-1 and 308-2. In various embodiments, preferred SISO AWVs 308-1 and 308-2 may comprise preferred AWVs for TX antenna array 332-1 with respect to SISO transmission by TX antenna array 332-1 to RX antenna arrays 334-1 and 334-2, respectively, at wireless communication device 304. In some embodiments, preferred SISO AWV set 306 may comprise preferred SISO AWVs 310-1 and 310-2. In various embodiments, preferred SISO AWVs 310-1 and 310-2 may comprise preferred AWVs for TX antenna array 332-2 with respect to SISO transmission by TX antenna array 332-2 to RX antenna arrays 334-1 and 334-2, respectively, at wireless communication device 304. The embodiments are not limited in this context.

In some embodiments, wireless communication device 304 may determine preferred MIMO AWV pair 326 according to a MIMO AWV selection procedure. In various embodiments, according to the MIMO AWV selection procedure, wireless communication device 304 may select MIMO AWVs 328-1 and 328-2 based on a preferred SISO AWV set 312. In some embodiments, each AWV in preferred SISO AWV set 312 may generally comprise a preferred AWV for a given RX antenna array of wireless communication device 304 with respect to SISO reception by that RX antenna array from a given TX antenna array of wireless communication device 302. In various embodiments, preferred SISO AWV set 312 may comprise preferred SISO AWVs 314-1 and 314-2. In some embodiments, preferred SISO AWVs 314-1 and 314-2 may comprise preferred AWVs for RX antenna array 334-1 with respect to SISO reception by RX antenna array 334-1 of transmissions of TX antenna arrays 332-1 and 332-2, respectively, of wireless communication device 302. In various embodiments, preferred SISO AWV set 312 may comprise preferred SISO AWVs 316-1 and 316-2. In some embodiments, preferred SISO AWVs 316-1 and 316-2 may comprise preferred AWVs for RX antenna array 334-2 with respect to SISO reception by RX antenna array 334-2 of transmissions of TX antenna arrays 332-1 and 332-2, respectively, of wireless communication device 302. The embodiments are not limited in this context.

In various embodiments, wireless communication devices 302 and 304 may engage in one or more beamforming training procedures in order to identify respective preferred SISO AWV sets 306 and 312. In some embodiments, in conjunction with the one or more beamforming training procedures, wireless communication device 302 may transmit beamforming training packets 318 to wireless communication device 304, and wireless communication device 304 may transmit beamforming training packets 320 to wireless communication device 302. In various embodiments, any given one of such beamforming training procedures may involve the use of one or more IEEE 802.11ad beamforming training algorithms, protocols, and/or frames. In some embodiments, the one or more beamforming training procedures may include one or more TXSSs. In various embodiments, the one or more beamforming training procedures may include a TXSS of TX antenna array 332-1 and a TXSS of TX antenna array 332-2. In some embodiments, the one or more beamforming training procedures may include one or more RXSSs. In various embodiments, the one or more beamforming training procedures may include an RXSS of RX antenna array 334-1 and an RXSS of RX antenna array 334-2. The embodiments are not limited in this context.

In some embodiments, the one or more beamforming training procedures may include one or more BRPs. In various embodiments, at least one of the one or more BRPs may comprise transmissions of a plurality of orthogonal training sequences. For example, during a given BRP in some embodiments, orthogonal respective training sequences may be transmitted concurrently by TX antenna arrays 332-1 and 332-2 of wireless communication device 302. In various embodiments, at least one of the one or more BRPs may comprise transmission of a BRP feedback frame that comprises feedback for multiple TX training sequences. For example, during a given BRP in some embodiments, orthogonal training sequences transmitted by TX antenna arrays 332-1 and 332-2, respectively, may be received concurrently at both RX antenna array 334-1 and RX antenna array 334-2 of wireless communication device 304, and wireless communication device 304 may transmit a BRP feedback frame that comprises respective feedback for both of the orthogonal training sequences. The embodiments are not limited to these examples.

In various embodiments, following identification of preferred SISO AWV sets 306 and 312, wireless communication devices 302 and 304 may use a MIMO AWV selection procedure to determine preferred MIMO AWV pairs 322 and 326 based on preferred SISO AWV sets 306 and 312. In some embodiments, according to the MIMO AWV selection procedure, wireless communication device 302 may either select preferred SISO AWV 308-1 as MIMO AWV 324-1 and preferred SISO AWV 310-2 as MIMO AWV 324-2 or select preferred SISO AWV 308-2 as MIMO AWV 324-1 and preferred SISO AWV 310-1 as MIMO AWV 324-2. In various embodiments, according to the MIMO AWV selection procedure, wireless communication device 304 may either select preferred SISO AWV 314-1 as MIMO AWV 328-1 and preferred SISO AWV 316-2 as MIMO AWV 328-2 or select preferred SISO AWV 314-2 as MIMO AWV 328-1 and preferred SISO AWV 316-1 as MIMO AWV 328-2. The embodiments are not limited in this context.

In some embodiments, the MIMO AWV selection procedure may comprise optimizing channel capacity for communications between wireless communication devices 302 and 304 according to an interference nulling technique. In various such embodiments, according to the MIMO AWV selection procedure, wireless communication device 302 may determine an inner product of preferred SISO AWVs 308-1 and 308-2 and an inner product of preferred SISO AWVs 310-1 and 310-2, and wireless communication device 304 may determine an inner product of preferred SISO AWVs 314-1 and 314-2 and an inner product of preferred SISO AWVs 316-1 and 316-2. In some embodiments, wireless communication devices 302 and 304 may communicate with each other to identify the minimum one of these four inner products. In various embodiments, a series of putative AWVs may then be calculated based on the pair of preferred SISO AWVs associated with the minimal inner product. In some embodiments, the series of putative AWVs may be calculated by stepping a value of $\alpha$ from 0 to 1 and calculated a respective putative AWV $u_0$ at each step according to Equation (1) above. In various embodiments, each of the series of putative AWVs may be evaluated based on a desirability criterion to determine a respective desirability value, and the putative AWV with the highest associated desirability value may be selected. In some embodiments, each desirability value may comprise a capacity determined according to Equations (2) to (4) above. In various other embodiments, each desirability value may comprise a value of a total SC zero forcing MSE or a value of a worst stream MSE. The embodiments are not limited to these examples.

In some embodiments, the MIMO AWV selection procedure may comprise identifying a preferred channel between wireless communication devices 302 and 304 and iteratively maximizing the capacity of a flat fading channel based on the preferred channel. In various such embodiments, wireless communication devices 302 and 304 may use BRP-based beamforming to identify preferred SISO AWVs 308-1, 308-2, 310-1, 310-2, 314-1, 314-2, 316-1, and 316-2. In some embodiments, the values of preferred SISO AWVs 308-1, 308-2, 310-1, 310-2, 314-1, 314-2, 316-1, and 316-2 may then be used as the values of $w_{T11}$, $w_{T12}$, $w_{T21}$, $w_{T22}$, $w_{R11}$, $w_{R21}$, $w_{R12}$, and $w_{R22}$ in conjunction with the iterative maximization of $w_{R1}Aw_{R2}$ and then $w_{T1}^{T}Bw_{T2}$ according to Equations (5) to (13) above. In various embodiments, each iteration of the MIMO AWV selection procedure may be performed using singular value decomposition. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
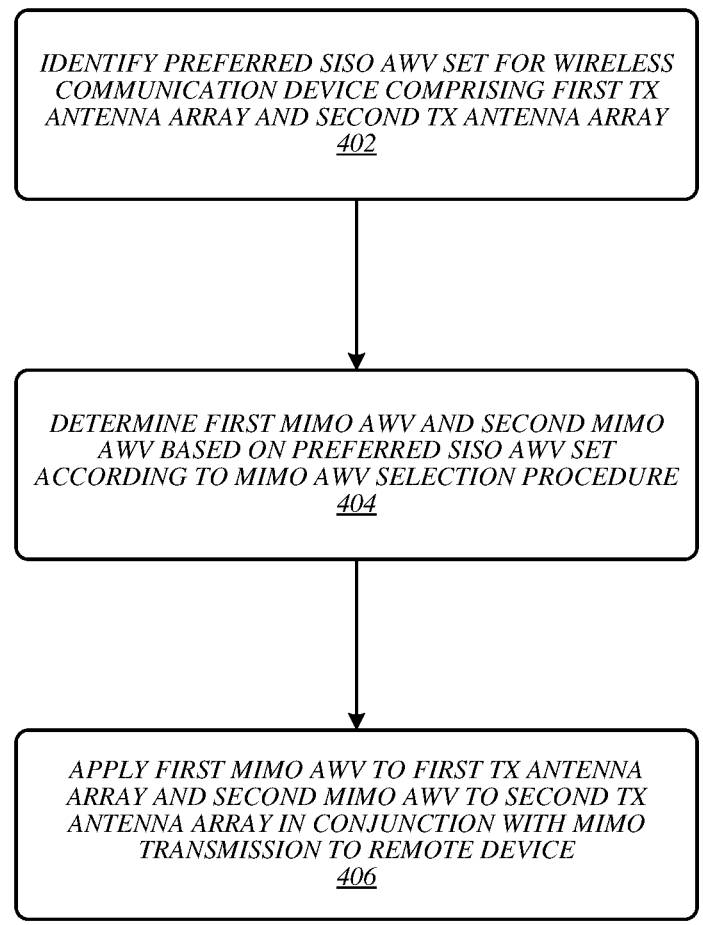
FIG. 4 illustrates an embodiment of a first logic flow.

FIG. 4 illustrates an example of a logic flow 400 that may be representative of the implementation of one or more of the disclosed antenna array weight vector selection techniques according to various embodiments. For example, logic flow 400 may be representative of operations that may be performed in some embodiments by wireless communication device 302 in operating environment 300 of FIG. 3. As shown in FIG. 4, a preferred SISO AWV set may be identified at 402 for a wireless communication device comprising a first TX antenna array and a second TX antenna array. For example, in operating environment 300 of FIG. 3, wireless communication device 302 may comprise TX antenna arrays 332-1 and 332-2, and may identify preferred SISO AWV set 306.

At 404, a first MIMO AWV and a second MIMO AWV may be identified based on the preferred SISO AWV set, according to a MIMO AWV selection procedure. For example, in operating environment 300 of FIG. 3, wireless communication device 302 may use a MIMO AWV selection procedure to determine preferred MIMO AWV pair 322 based on preferred SISO AWV set 306, and preferred MIMO AWV pair 322 may comprise MIMO AWVs 324-1 and 324-2. At 406, in conjunction with MIMO transmission to a remote device, the first MIMO AWV may be applied to the first TX antenna array and the second MIMO AWV may be applied to the second TX antenna array. For example, in operating environment 300 of FIG. 3, in conjunction with transmission of data packets 330 to wireless communication device 304 via MIMO link 350, wireless communication device 302 may apply MIMO AWV 324-1 to TX antenna array 332-1 and may apply MIMO AWV 324-2 to TX antenna array 332-2. The embodiments are not limited to these examples.

Figure 5:
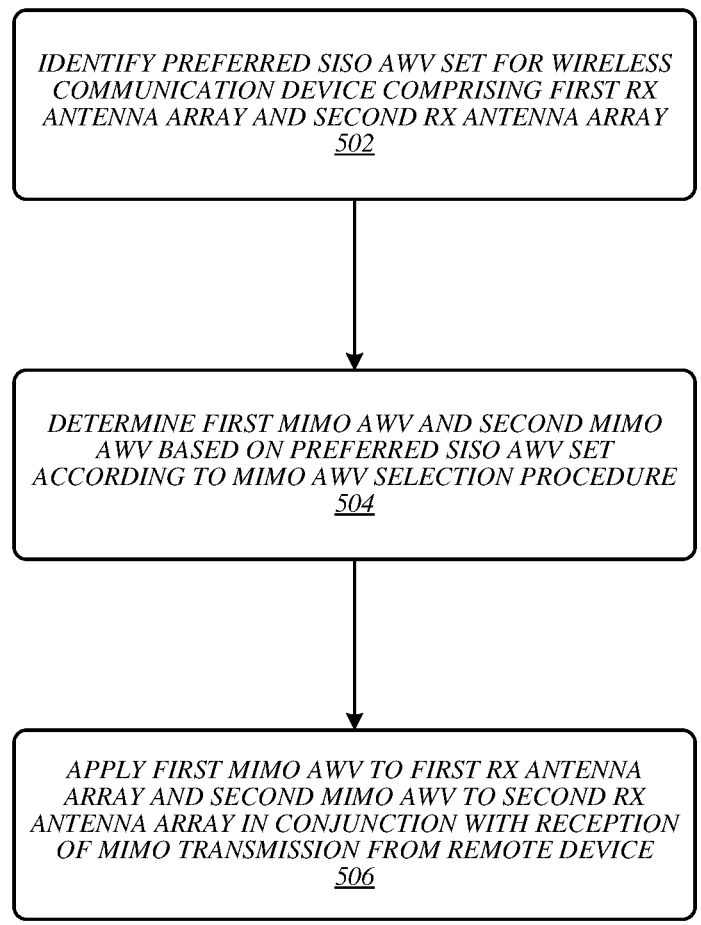
FIG. 5 illustrates an embodiment of a second logic flow.

FIG. 5 illustrates an example of a logic flow 500 that may be representative of the implementation of one or more of the disclosed antenna array weight vector selection techniques according to various embodiments. For example, logic flow 500 may be representative of operations that may be performed in some embodiments by wireless communication device 304 in operating environment 300 of FIG. 3. As shown in FIG. 5, a preferred SISO AWV set may be identified at 502 for a wireless communication device comprising a first RX antenna array and a second RX antenna array. For example, in operating environment 300 of FIG. 3, wireless communication device 304 may comprise RX antenna arrays 334-1 and 334-2, and may identify preferred SISO AWV set 312.

At 504, a first MIMO AWV and a second MIMO AWV may be identified based on the preferred SISO AWV set, according to a MIMO AWV selection procedure. For example, in operating environment 300 of FIG. 3, wireless communication device 304 may use a MIMO AWV selection procedure to determine preferred MIMO AWV pair 326 based on preferred SISO AWV set 312, and preferred MIMO AWV pair 326 may comprise MIMO AWVs 328-1 and 328-2. At 506, in conjunction with reception of a MIMO transmission from a remote device, the first MIMO AWV may be applied to the first RX antenna array and the second MIMO AWV may be applied to the second RX antenna array. For example, in operating environment 300 of FIG. 3, in conjunction with reception of data packets 330 from wireless communication device 302 via MIMO link 350, wireless communication device 304 may apply MIMO AWV 328-1 to RX antenna array 334-1 and may apply MIMO AWV 328-2 to RX antenna array 334-2. The embodiments are not limited to these examples.

In some embodiments, one or more of the disclosed antenna array weight vector selection techniques may be implemented fully or partially in software and/or firmware. In various embodiments, such software and/or firmware may take the form of instructions contained in or on a non-transitory computer-readable storage medium. In some embodiments, such instructions may be read and executed by one or more processors to enable performance of operations described herein. Such instructions may comprise any suitable form, such as—but not limited to—source code, compiled code, interpreted code, executable code, static code, dynamic code, and the like. Such a computer-readable medium may include any tangible non-transitory medium for storing information in a form readable by one or more computers, such as—but not limited to—read only memory (ROM), random access memory (RAM), magnetic disk storage media, optical storage media, a flash memory, etc.

FIG. 6 illustrates an embodiment of a storage medium 600. Storage medium 600 may comprise any non-transitory computer-readable storage medium or machine-readable storage medium, such as an optical, magnetic or semiconductor storage medium. In various embodiments, storage medium 600 may comprise an article of manufacture. In some embodiments, storage medium 600 may store computer-executable instructions, such as computer-executable instructions to implement one or both of logic flow 400 of FIG. 4 and logic flow 500 of FIG. 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 7:
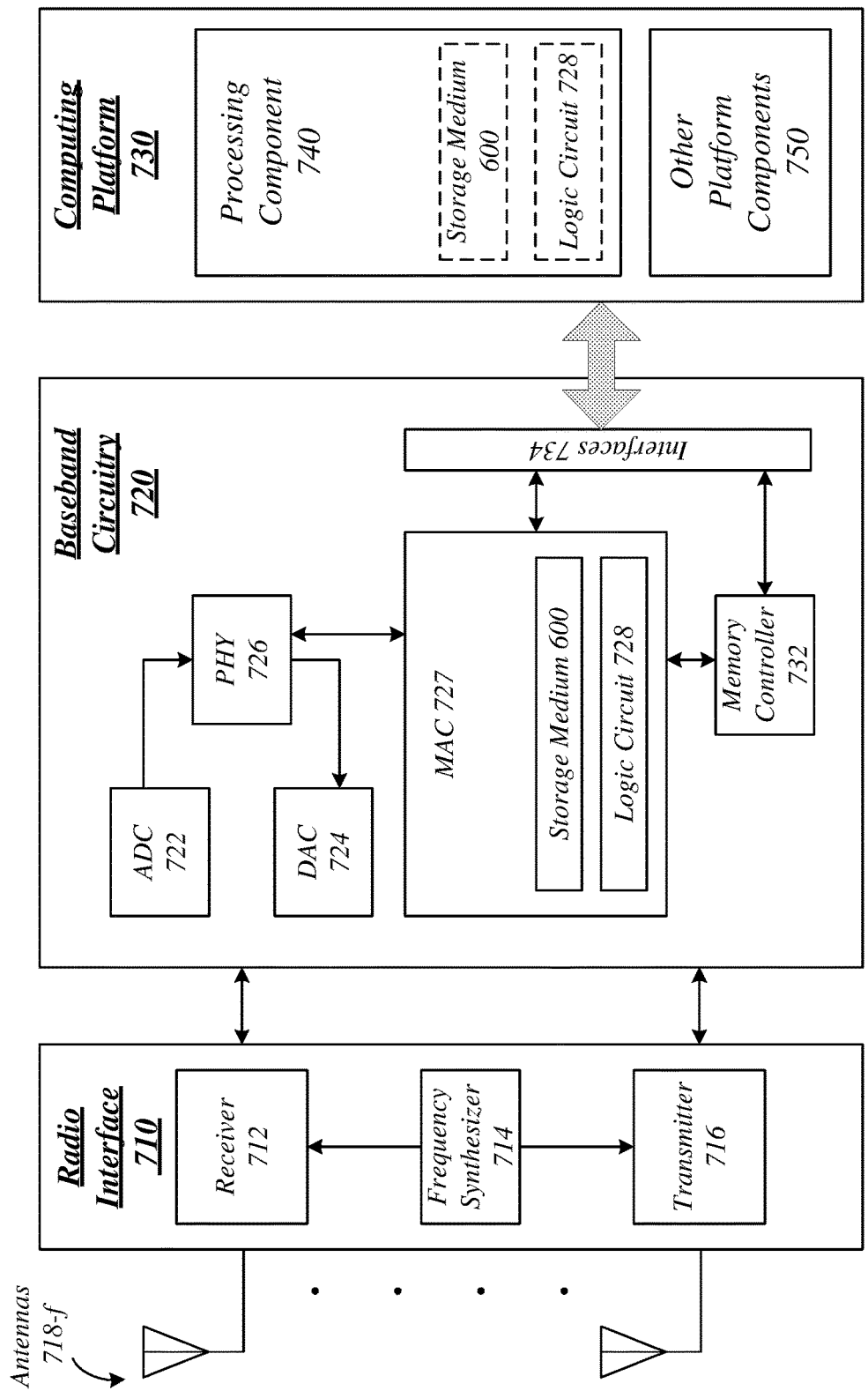
FIG. 7 illustrates an embodiment of a device.

FIG. 7 illustrates an embodiment of a communications device 700 that may implement one or more of wireless communication devices 302 and 304 of FIG. 3, logic flow 400 of FIG. 4, logic flow 500 of FIG. 5, and storage medium 600 of FIG. 6. In various embodiments, device 700 may comprise a logic circuit 728. The logic circuit 728 may include physical circuits to perform operations described for one or more of wireless communication devices 302 and 304 of FIG. 3, logic flow 400 of FIG. 4, and logic flow 500 of FIG. 5, for example. As shown in FIG. 7, device 700 may include a radio interface 710, baseband circuitry 720, and computing platform 730, although the embodiments are not limited to this configuration.

The device 700 may implement some or all of the structure and/or operations for one or more of wireless communication devices 302 and 304 of FIG. 3, logic flow 400 of FIG. 4, logic flow 500 of FIG. 5, storage medium 600, and logic circuit 728 in a single computing entity, such as entirely within a single device. Alternatively, the device 700 may distribute portions of the structure and/or operations for one or more of wireless communication devices 302 and 304 of FIG. 3, logic flow 400 of FIG. 4, logic flow 500 of FIG. 5, storage medium 600, and logic circuit 728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 710 may include, for example, a receiver 712, a frequency synthesizer 714, and/or a transmitter 716. Radio interface 710 may include bias controls, a crystal oscillator and/or one or more antennas 718-f. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a medium access control (MAC) processing circuit 727 for MAC/data link layer processing. Baseband circuitry 720 may include a memory controller 732 for communicating with MAC processing circuit 727 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames. Alternatively or in addition, MAC processing circuit 727 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for one or more of wireless communication devices 302 and 304 of FIG. 3, logic flow 400 of FIG. 4, logic flow 500 of FIG. 5, storage medium 600, and logic circuit 728 using the processing component 740. The processing component 740 (and/or PHY 726 and/or MAC 727) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired.

Embodiments of device 700 may be implemented using single input single output (SISO) architectures. However, certain implementations may include multiple antennas (e.g., antennas 718-f) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 8:
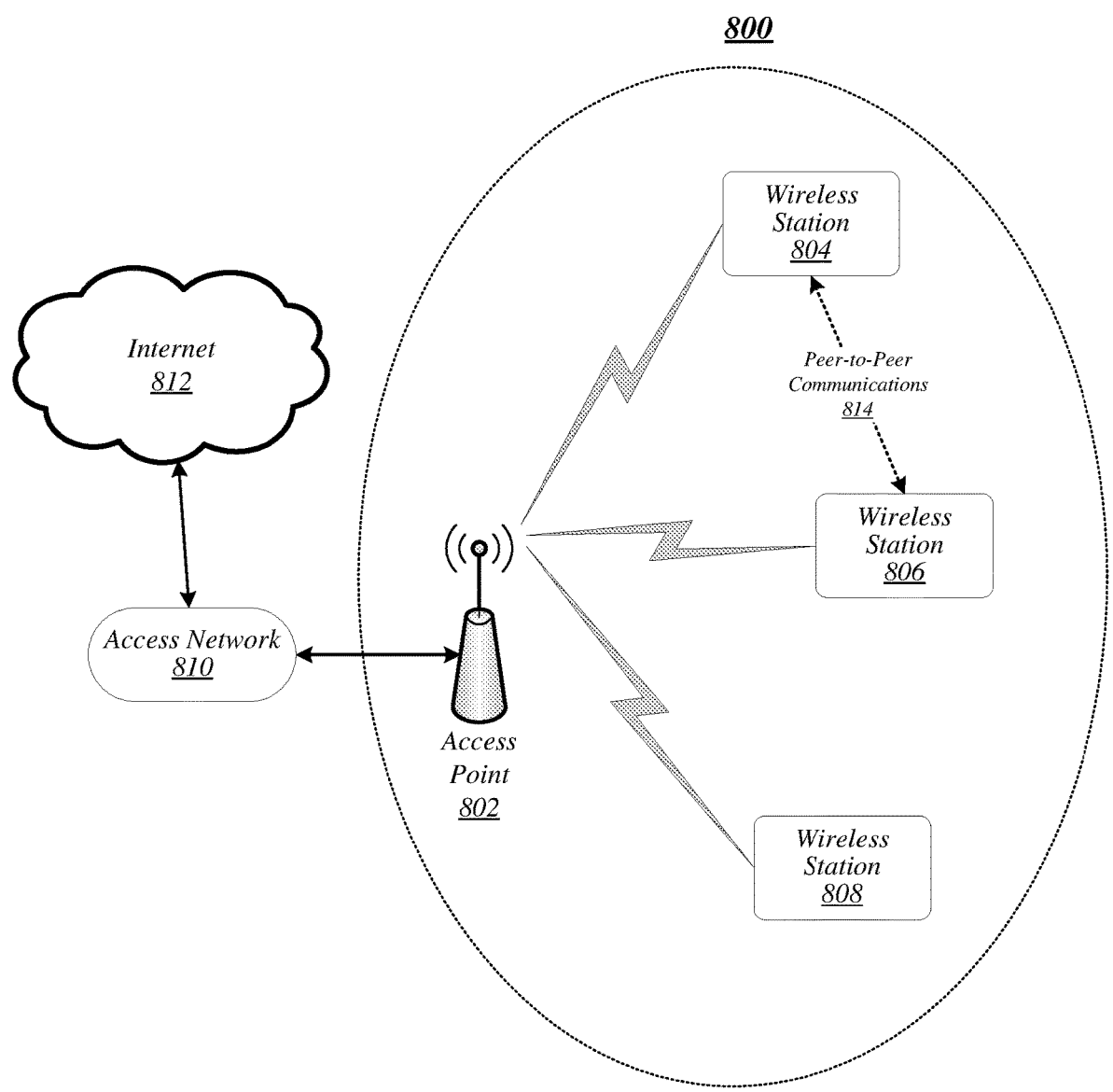
FIG. 8 illustrates an embodiment of a wireless network.

FIG. 8 illustrates an embodiment of a wireless network 800. As shown in FIG. 8, wireless network comprises an access point 802 and wireless stations 804, 806, and 808. In various embodiments, wireless network 800 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 800 may comprise another type of wireless network, and/or may implement other wireless communications standards. In various embodiments, for example, wireless network 800 may comprise a WWAN or WPAN rather than a WLAN. The embodiments are not limited to this example.

In some embodiments, wireless network 800 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 804, 806, and 808 may communicate with access point 802 in order to obtain connectivity to one or more external data networks. In some embodiments, for example, wireless stations 804, 806, and 808 may connect to the Internet 812 via access point 802 and access network 810. In various embodiments, access network 810 may comprise a private network that provides subscription-based Internet-connectivity, such as an Internet Service Provider (ISP) network. The embodiments are not limited to this example.

In various embodiments, two or more of wireless stations 804, 806, and 808 may communicate with each other directly by exchanging peer-to-peer communications. For example, in the example of FIG. 8, wireless stations 804 and 806 communicate with each other directly by exchanging peer-to-peer communications 814. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is an apparatus, comprising a memory, and logic, at least a portion of which is comprised in circuitry coupled to the memory, the logic to identify a preferred single-input single-output (SISO) antenna array weight vector (AWV) set for a wireless communication device comprising a first transmit (TX) antenna array and a second TX antenna array, and determine a preferred multiple-input multiple-output (MIMO) AWV pair for the wireless communication device based on the preferred SISO AWV set according to a MIMO AWV selection procedure, the preferred MIMO AWV pair to comprise a first MIMO AWV comprising an AWV for application to the first TX antenna array in conjunction with a MIMO transmission to a remote device and, a second MIMO AWV comprising an AWV for application to the second TX antenna array in conjunction with the MIMO transmission to the remote device.

Example 2 is the apparatus of Example 1, the preferred SISO AWV set to comprise a preferred AWV $v_{11}$ with respect to SISO transmission by the first TX antenna array to a first receive (RX) antenna array of the remote device, a preferred AWV $v_{12}$ with respect to SISO transmission by the first TX antenna array to a second RX antenna array of the remote device, a preferred AWV $v_{21}$ with respect to SISO transmission by the second TX antenna array to the first RX antenna array of the remote device, and a preferred AWV $v_{22}$ with respect to SISO transmission by the second TX antenna array to the second RX antenna array of the remote device.

Example 3 is the apparatus of Example 2, the MIMO AWV selection procedure to comprise selecting $v_{11}$ as the first MIMO AWV and $v_{22}$ as the second MIMO AWV, or selecting $v_{12}$ as the first MIMO AWV and $v_{21}$ as the second MIMO AWV.

Example 4 is the apparatus of any of Examples 1 to 2, the MIMO AWV selection procedure to comprise optimizing channel capacity for communications between the wireless communication device and the remote device according to an interference nulling technique.

Example 5 is the apparatus of any of Examples 1 to 2, the MIMO AWV selection procedure to comprise identifying a preferred channel between the wireless communication device and the remote device, and iteratively maximizing a capacity of a flat fading channel based on the preferred channel.

Example 6 is the apparatus of any of Examples 1 to 5, the logic to identify the preferred SISO AWV set by engaging in one or more beamforming training procedures.

Example 7 is the apparatus of Example 6, the one or more beamforming training procedures to include one or more transmit sector sweeps (TXSSs).

Example 8 is the apparatus of Example 7, the one or more beamforming training procedures to include a TXSS of the first TX antenna array and a TXSS of the second TX antenna array.

Example 9 is the apparatus of any of Examples 6 to 8, the one or more beamforming training procedures to include one or more receive sector sweeps (RXSSs).

Example 10 is the apparatus of any of Examples 6 to 9, the one or more beamforming training procedures to include one or more beam refinement phases (BRPs).

Example 11 is the apparatus of Example 10, at least one of the one or more BRPs to comprise transmissions of a plurality of orthogonal training sequences.

Example 12 is the apparatus of any of Examples 10 to 11, at least one of the one or more BRPs to comprise transmission of a BRP feedback frame comprising feedback for multiple TX training sequences.

Example 13 is the apparatus of any of Examples 1 to 12, the first and second TX antenna arrays to comprise steerable phased antenna arrays.

Example 14 is the apparatus of any of Examples 1 to 13, the wireless communication device to comprise a directional multi-gigabit (DMG) station (STA).

Example 15 is the apparatus of any of Examples 1 to 14, the wireless communication device to operate as a personal basic service set control point/access point (PCP/AP).

Example 16 is the apparatus of any of Examples 1 to 15, the MIMO transmission to comprise a transmission via a 60 GHz frequency band MIMO link.

Example 17 is a system, comprising an apparatus according to any of Examples 1 to 16, and at least one radio frequency (RF) transceiver.

Example 18 is the system of Example 17, comprising at least one processor.

Example 19 is the system of any of Examples 17 to 18, comprising at least one RF antenna.

Example 20 is the system of any of Examples 17 to 19, comprising a touchscreen display.

Example 21 is an apparatus, comprising a memory, and logic, at least a portion of which is comprised in circuitry coupled to the memory, the logic to identify a preferred single-input single-output (SISO) antenna array weight vector (AWV) set for a wireless communication device comprising a first receive (RX) antenna array and a second RX antenna array, and determine a preferred multiple-input multiple-output (MIMO) AWV pair for the wireless communication device based on the preferred SISO AWV set according to a MIMO AWV selection procedure, the preferred MIMO AWV pair to comprise a first MIMO AWV comprising an AWV for application to the first RX antenna array in conjunction with reception of a MIMO transmission from a remote device and, a second MIMO AWV comprising an AWV for application to the second RX antenna array in conjunction with reception of the MIMO transmission from the remote device.

Example 22 is the apparatus of Example 21, the preferred SISO AWV set to comprise a preferred AWV $w_{11}$ with respect to SISO reception by the first RX antenna array from a first transmit (TX) antenna array of the remote device, a preferred AWV $w_{21}$ with respect to SISO reception by the first RX antenna array from a second TX antenna array of the remote device, a preferred AWV $w_{12}$ with respect to SISO reception by the second RX antenna array from the first TX antenna array of the remote device, and a preferred AWV $w_{22}$ with respect to SISO reception by the second RX antenna array from the second TX antenna array of the remote device.

Example 23 is the apparatus of Example 21, the MIMO AWV selection procedure to comprise selecting $w_{11}$ as the first MIMO AWV and $w_{22}$ as the second MIMO AWV, or selecting $w_{21}$ as the first MIMO AWV and $w_{12}$ as the second MIMO AWV.

Example 24 is the apparatus of any of Examples 21 to 22, the MIMO AWV selection procedure to comprise optimizing channel capacity for communications between the wireless communication device and the remote device according to an interference nulling technique.

Example 25 is the apparatus of any of Examples 21 to 22, the MIMO AWV selection procedure to comprise identifying a preferred channel between the wireless communication device and the remote device, and iteratively maximizing a capacity of a flat fading channel based on the preferred channel.

Example 26 is the apparatus of any of Examples 21 to 25, the logic to identify the preferred SISO AWV set by engaging in one or more beamforming training procedures.

Example 27 is the apparatus of Example 26, the one or more beamforming training procedures to include one or more receive sector sweeps (RXSSs).

Example 28 is the apparatus of Example 27, the one or more beamforming training procedures to include an RXSS of the first RX antenna array and an RXSS of the second RX antenna array.

Example 29 is the apparatus of any of Examples 26 to 28, the one or more beamforming training procedures to include one or more transmit sector sweeps (TXSSs).

Example 30 is the apparatus of any of Examples 26 to 29, the one or more beamforming training procedures to include one or more beam refinement phases (BRPs).

Example 31 is the apparatus of Example 30, at least one of the one or more BRPs to comprise transmissions of a plurality of orthogonal training sequences.

Example 32 is the apparatus of any of Examples 30 to 31, at least one of the one or more BRPs to comprise transmission of a BRP feedback frame comprising feedback for multiple TX training sequences.

Example 33 is the apparatus of any of Examples 21 to 32, the first and second RX antenna arrays to comprise steerable phased antenna arrays.

Example 34 is the apparatus of any of Examples 21 to 33, the wireless communication device to comprise a directional multi-gigabit (DMG) station (STA).

Example 35 is the apparatus of any of Examples 21 to 34, the wireless communication device to operate as a personal basic service set control point/access point (PCP/AP).

Example 36 is the apparatus of any of Examples 21 to 35, the MIMO transmission to be received via a 60 GHz frequency band MIMO link.

Example 37 is a system, comprising an apparatus according to any of Examples 21 to 36, and at least one radio frequency (RF) transceiver.

Example 38 is the system of Example 37, comprising at least one processor.

Example 39 is the system of any of Examples 37 to 38, comprising at least one RF antenna.

Example 40 is the system of any of Examples 37 to 39, comprising a touchscreen display.

Example 41 is at least one computer-readable storage medium comprising a set of instructions that, in response to being executed on a computing device, cause the computing device to identify a preferred single-input single-output (SISO) antenna array weight vector (AWV) set for a wireless communication device comprising a first transmit (TX) antenna array and a second TX antenna array, and determine a preferred multiple-input multiple-output (MIMO) AWV pair for the wireless communication device based on the preferred SISO AWV set according to a MIMO AWV selection procedure, the preferred MIMO AWV pair to comprise a first MIMO AWV comprising an AWV for application to the first TX antenna array in conjunction with a MIMO transmission to a remote device and, a second MIMO AWV comprising an AWV for application to the second TX antenna array in conjunction with the MIMO transmission to the remote device.

Example 42 is the at least one computer-readable storage medium of Example 41, the preferred SISO AWV set to comprise a preferred AWV $v_{11}$ with respect to SISO transmission by the first TX antenna array to a first receive (RX) antenna array of the remote device, a preferred AWV $v_{12}$ with respect to SISO transmission by the first TX antenna array to a second RX antenna array of the remote device, a preferred AWV $v_{21}$ with respect to SISO transmission by the second TX antenna array to the first RX antenna array of the remote device, and a preferred AWV $v_{22}$ with respect to SISO transmission by the second TX antenna array to the second RX antenna array of the remote device.

Example 43 is the at least one computer-readable storage medium of Example 42, the MIMO AWV selection procedure to comprise selecting $v_{11}$ as the first MIMO AWV and $v_{22}$ as the second MIMO AWV, or selecting $v_{12}$ as the first MIMO AWV and $v_{21}$ as the second MIMO AWV.

Example 44 is the at least one computer-readable storage medium of any of Examples 41 to 42, the MIMO AWV selection procedure to comprise optimizing channel capacity for communications between the wireless communication device and the remote device according to an interference nulling technique.

Example 45 is the at least one computer-readable storage medium of any of Examples 41 to 42, the MIMO AWV selection procedure to comprise identifying a preferred channel between the wireless communication device and the remote device, and iteratively maximizing a capacity of a flat fading channel based on the preferred channel.

Example 46 is the at least one computer-readable storage medium of any of Examples 41 to 45, comprising instructions that, in response to being executed on the computing device, cause the computing device to identify the preferred SISO AWV set by engaging in one or more beamforming training procedures.

Example 47 is the at least one computer-readable storage medium of Example 46, the one or more beamforming training procedures to include one or more transmit sector sweeps (TXSSs).

Example 48 is the at least one computer-readable storage medium of Example 47, the one or more beamforming training procedures to include a TXSS of the first TX antenna array and a TXSS of the second TX antenna array.

Example 49 is the at least one computer-readable storage medium of any of Examples 46 to 48, the one or more beamforming training procedures to include one or more receive sector sweeps (RXSSs).

Example 50 is the at least one computer-readable storage medium of any of Examples 46 to 49, the one or more beamforming training procedures to include one or more beam refinement phases (BRPs).

Example 51 is the at least one computer-readable storage medium of Example 50, at least one of the one or more BRPs to comprise transmissions of a plurality of orthogonal training sequences.

Example 52 is the at least one computer-readable storage medium of any of Examples 50 to 51, at least one of the one or more BRPs to comprise transmission of a BRP feedback frame comprising feedback for multiple TX training sequences.

Example 53 is the at least one computer-readable storage medium of any of Examples 41 to 52, the first and second TX antenna arrays to comprise steerable phased antenna arrays.

Example 54 is the at least one computer-readable storage medium of any of Examples 41 to 53, the wireless communication device to comprise a directional multi-gigabit (DMG) station (STA).

Example 55 is the at least one computer-readable storage medium of any of Examples 41 to 54, the wireless communication device to operate as a personal basic service set control point/access point (PCP/AP).

Example 56 is the at least one computer-readable storage medium of any of Examples 41 to 55, the MIMO transmission to comprise a transmission via a 60 GHz frequency band MIMO link.

Example 57 is at least one computer-readable storage medium comprising a set of instructions that, in response to being executed on a computing device, cause the computing device to identify a preferred single-input single-output (SISO) antenna array weight vector (AWV) set for a wireless communication device comprising a first receive (RX) antenna array and a second RX antenna array, and determine a preferred multiple-input multiple-output (MIMO) AWV pair for the wireless communication device based on the preferred SISO AWV set according to a MIMO AWV selection procedure, the preferred MIMO AWV pair to comprise a first MIMO AWV comprising an AWV for application to the first RX antenna array in conjunction with reception of a MIMO transmission from a remote device and, a second MIMO AWV comprising an AWV for application to the second RX antenna array in conjunction with reception of the MIMO transmission from the remote device.

Example 58 is the at least one computer-readable storage medium of Example 57, the preferred SISO AWV set to comprise a preferred AWV $w_{11}$ with respect to SISO reception by the first RX antenna array from a first transmit (TX) antenna array of the remote device, a preferred AWV $w_{21}$ with respect to SISO reception by the first RX antenna array from a second TX antenna array of the remote device, a preferred AWV $w_{12}$ with respect to SISO reception by the second RX antenna array from the first TX antenna array of the remote device, and a preferred AWV $w_{22}$ with respect to SISO reception by the second RX antenna array from the second TX antenna array of the remote device.

Example 59 is the at least one computer-readable storage medium of Example 58, the MIMO AWV selection procedure to comprise selecting $w_{11}$ as the first MIMO AWV and $w_{22}$ as the second MIMO AWV, or selecting $w_{21}$ as the first MIMO AWV and $w_{12}$ as the second MIMO AWV.

Example 60 is the at least one computer-readable storage medium of any of Examples 57 to 58, the MIMO AWV selection procedure to comprise optimizing channel capacity for communications between the wireless communication device and the remote device according to an interference nulling technique.

Example 61 is the at least one computer-readable storage medium of any of Examples 57 to 58, the MIMO AWV selection procedure to comprise identifying a preferred channel between the wireless communication device and the remote device, and iteratively maximizing a capacity of a flat fading channel based on the preferred channel.

Example 62 is the at least one computer-readable storage medium of any of Examples 57 to 61, comprising instructions that, in response to being executed on the computing device, cause the computing device to identify the preferred SISO AWV set by engaging in one or more beamforming training procedures.

Example 63 is the at least one computer-readable storage medium of Example 62, the one or more beamforming training procedures to include one or more receive sector sweeps (RXSSs).

Example 64 is the at least one computer-readable storage medium of Example 63, the one or more beamforming training procedures to include an RXSS of the first RX antenna array and an RXSS of the second RX antenna array.

Example 65 is the at least one computer-readable storage medium of any of Examples 62 to 64, the one or more beamforming training procedures to include one or more transmit sector sweeps (TXSSs).

Example 66 is the at least one computer-readable storage medium of any of Examples 62 to 65, the one or more beamforming training procedures to include one or more beam refinement phases (BRPs).

Example 67 is the at least one computer-readable storage medium of Example 66, at least one of the one or more BRPs to comprise transmissions of a plurality of orthogonal training sequences.

Example 68 is the at least one computer-readable storage medium of any of Examples 66 to 67, at least one of the one or more BRPs to comprise transmission of a BRP feedback frame comprising feedback for multiple TX training sequences.

Example 69 is the at least one computer-readable storage medium of any of Examples 57 to 68, the first and second RX antenna arrays to comprise steerable phased antenna arrays.

Example 70 is the at least one computer-readable storage medium of any of Examples 57 to 69, the wireless communication device to comprise a directional multi-gigabit (DMG) station (STA).

Example 71 is the at least one computer-readable storage medium of any of Examples 57 to 70, the wireless communication device to operate as a personal basic service set control point/access point (PCP/AP).

Example 72 is the at least one computer-readable storage medium of any of Examples 57 to 71, the MIMO transmission to be received via a 60 GHz frequency band MIMO link.

Example 73 is a method, comprising identifying a preferred single-input single-output (SISO) antenna array weight vector (AWV) set for a wireless communication device comprising a first transmit (TX) antenna array and a second TX antenna array, and determining, by circuitry of the wireless communication device, a preferred multiple-input multiple-output (MIMO) AWV pair for the wireless communication device based on the preferred SISO AWV set according to a MIMO AWV selection procedure, the preferred MIMO AWV pair to comprise a first MIMO AWV comprising an AWV for application to the first TX antenna array in conjunction with a MIMO transmission to a remote device and, a second MIMO AWV comprising an AWV for application to the second TX antenna array in conjunction with the MIMO transmission to the remote device.

Example 74 is the method of Example 73, the preferred SISO AWV set to comprise a preferred AWV $v_{11}$ with respect to SISO transmission by the first TX antenna array to a first receive (RX) antenna array of the remote device, a preferred AWV $v_{12}$ with respect to SISO transmission by the first TX antenna array to a second RX antenna array of the remote device, a preferred AWV $v_{21}$ with respect to SISO transmission by the second TX antenna array to the first RX antenna array of the remote device, and a preferred AWV $v_{22}$ with respect to SISO transmission by the second TX antenna array to the second RX antenna array of the remote device.

Example 75 is the method of Example 74, the MIMO AWV selection procedure to comprise selecting $v_{11}$ as the first MIMO AWV and $v_{22}$ as the second MIMO AWV, or selecting $v_{12}$ as the first MIMO AWV and $v_{21}$ as the second MIMO AWV.

Example 76 is the method of any of Examples 73 to 74, the MIMO AWV selection procedure to comprise optimizing channel capacity for communications between the wireless communication device and the remote device according to an interference nulling technique.

Example 77 is the method of any of Examples 73 to 74, the MIMO AWV selection procedure to comprise identifying a preferred channel between the wireless communication device and the remote device, and iteratively maximizing a capacity of a flat fading channel based on the preferred channel.

Example 78 is the method of any of Examples 73 to 77, comprising identifying the preferred SISO AWV set by engaging in one or more beamforming training procedures.

Example 79 is the method of Example 78, the one or more beamforming training procedures to include one or more transmit sector sweeps (TXSSs).

Example 80 is the method of Example 79, the one or more beamforming training procedures to include a TXSS of the first TX antenna array and a TXSS of the second TX antenna array.

Example 81 is the method of any of Examples 78 to 80, the one or more beamforming training procedures to include one or more receive sector sweeps (RXSSs).

Example 82 is the method of any of Examples 78 to 81, the one or more beamforming training procedures to include one or more beam refinement phases (BRPs).

Example 83 is the method of Example 82, at least one of the one or more BRPs to comprise transmissions of a plurality of orthogonal training sequences.

Example 84 is the method of any of Examples 82 to 83, at least one of the one or more BRPs to comprise transmission of a BRP feedback frame comprising feedback for multiple TX training sequences.

Example 85 is the method of any of Examples 73 to 84, the first and second TX antenna arrays to comprise steerable phased antenna arrays.

Example 86 is the method of any of Examples 73 to 85, the wireless communication device to comprise a directional multi-gigabit (DMG) station (STA).

Example 87 is the method of any of Examples 73 to 86, the wireless communication device to operate as a personal basic service set control point/access point (PCP/AP).

Example 88 is the method of any of Examples 73 to 87, the MIMO transmission to comprise a transmission via a 60 GHz frequency band MIMO link.

Example 89 is at least one computer-readable storage medium comprising a set of instructions that, in response to being executed on a computing device, cause the computing device to perform a method according to any of Examples 73 to 88.

Example 90 is an apparatus, comprising means for performing a method according to any of Examples 73 to 88.

Example 91 is a system, comprising the apparatus of Example 90, and at least one radio frequency (RF) transceiver.

Example 92 is the system of Example 91, comprising at least one processor.

Example 93 is the system of any of Examples 91 to 92, comprising at least one RF antenna.

Example 94 is the system of any of Examples 91 to 93, comprising a touchscreen display.

Example 95 is a method, comprising identifying a preferred single-input single-output (SISO) antenna array weight vector (AWV) set for a wireless communication device comprising a first receive (RX) antenna array and a second RX antenna array, and determining, by circuitry of the wireless communication device, a preferred multiple-input multiple-output (MIMO) AWV pair for the wireless communication device based on the preferred SISO AWV set according to a MIMO AWV selection procedure, the preferred MIMO AWV pair to comprise a first MIMO AWV comprising an AWV for application to the first RX antenna array in conjunction with reception of a MIMO transmission from a remote device and, a second MIMO AWV comprising an AWV for application to the second RX antenna array in conjunction with reception of the MIMO transmission from the remote device.

Example 96 is the method of Example 95, the preferred SISO AWV set to comprise a preferred AWV $w_{11}$ with respect to SISO reception by the first RX antenna array from a first transmit (TX) antenna array of the remote device, a preferred AWV $w_{21}$ with respect to SISO reception by the first RX antenna array from a second TX antenna array of the remote device, a preferred AWV $w_{12}$ with respect to SISO reception by the second RX antenna array from the first TX antenna array of the remote device, and a preferred AWV $w_{22}$ with respect to SISO reception by the second RX antenna array from the second TX antenna array of the remote device.

Example 97 is the method of Example 96, the MIMO AWV selection procedure to comprise selecting $w_{11}$ as the first MIMO AWV and $w_{22}$ as the second MIMO AWV, or selecting $w_{21}$ as the first MIMO AWV and $w_{12}$ as the second MIMO AWV.

Example 98 is the method of any of Examples 95 to 96, the MIMO AWV selection procedure to comprise optimizing channel capacity for communications between the wireless communication device and the remote device according to an interference nulling technique.

Example 99 is the method of any of Examples 95 to 96, the MIMO AWV selection procedure to comprise identifying a preferred channel between the wireless communication device and the remote device, and iteratively maximizing a capacity of a flat fading channel based on the preferred channel.

Example 100 is the method of any of Examples 95 to 99, comprising identifying the preferred SISO AWV set by engaging in one or more beamforming training procedures.

Example 101 is the method of Example 100, the one or more beamforming training procedures to include one or more receive sector sweeps (RXSSs).

Example 102 is the method of Example 101, the one or more beamforming training procedures to include an RXSS of the first RX antenna array and an RXSS of the second RX antenna array.

Example 103 is the method of any of Examples 100 to 102, the one or more beamforming training procedures to include one or more transmit sector sweeps (TXSSs).

Example 104 is the method of any of Examples 100 to 103, the one or more beamforming training procedures to include one or more beam refinement phases (BRPs).

Example 105 is the method of Example 104, at least one of the one or more BRPs to comprise transmissions of a plurality of orthogonal training sequences.

Example 106 is the method of any of Examples 104 to 105, at least one of the one or more BRPs to comprise transmission of a BRP feedback frame comprising feedback for multiple TX training sequences.

Example 107 is the method of any of Examples 95 to 106, the first and second RX antenna arrays to comprise steerable phased antenna arrays.

Example 108 is the method of any of Examples 95 to 107, the wireless communication device to comprise a directional multi-gigabit (DMG) station (STA).

Example 109 is the method of any of Examples 95 to 108, the wireless communication device to operate as a personal basic service set control point/access point (PCP/AP).

Example 110 is the method of any of Examples 95 to 109, the MIMO transmission to be received via a 60 GHz frequency band MIMO link.

Example 111 is at least one computer-readable storage medium comprising a set of instructions that, in response to being executed on a computing device, cause the computing device to perform a method according to any of Examples 95 to 110.

Example 112 is an apparatus, comprising means for performing a method according to any of Examples 95 to 110.

Example 113 is a system, comprising the apparatus of Example 112, and at least one radio frequency (RF) transceiver.

Example 114 is the system of Example 113, comprising at least one processor.

Example 115 is the system of any of Examples 113 to 114, comprising at least one RF antenna.

Example 116 is the system of any of Examples 113 to 115, comprising a touchscreen display.

Example 117 is an apparatus, comprising means for identifying a preferred single-input single-output (SISO) antenna array weight vector (AWV) set for a wireless communication device comprising a first transmit (TX) antenna array and a second TX antenna array, and means for determining a preferred multiple-input multiple-output (MIMO) AWV pair for the wireless communication device based on the preferred SISO AWV set according to a MIMO AWV selection procedure, the preferred MIMO AWV pair to comprise a first MIMO AWV comprising an AWV for application to the first TX antenna array in conjunction with a MIMO transmission to a remote device and, a second MIMO AWV comprising an AWV for application to the second TX antenna array in conjunction with the MIMO transmission to the remote device.

Example 118 is the apparatus of Example 117, the preferred SISO AWV set to comprise a preferred AWV $v_{11}$ with respect to SISO transmission by the first TX antenna array to a first receive (RX) antenna array of the remote device, a preferred AWV $v_{12}$ with respect to SISO transmission by the first TX antenna array to a second RX antenna array of the remote device, a preferred AWV $v_{21}$ with respect to SISO transmission by the second TX antenna array to the first RX antenna array of the remote device, and a preferred AWV $v_{22}$ with respect to SISO transmission by the second TX antenna array to the second RX antenna array of the remote device.

Example 119 is the apparatus of Example 118, the MIMO AWV selection procedure to comprise selecting $v_{11}$ as the first MIMO AWV and $v_{22}$ as the second MIMO AWV, or selecting $v_{12}$ as the first MIMO AWV and $v_{21}$ as the second MIMO AWV.

Example 120 is the apparatus of any of Examples 117 to 118, the MIMO AWV selection procedure to comprise optimizing channel capacity for communications between the wireless communication device and the remote device according to an interference nulling technique.

Example 121 is the apparatus of any of Examples 117 to 118, the MIMO AWV selection procedure to comprise identifying a preferred channel between the wireless communication device and the remote device, and iteratively maximizing a capacity of a flat fading channel based on the preferred channel.

Example 122 is the apparatus of any of Examples 117 to 121, comprising means for identifying the preferred SISO AWV set by engaging in one or more beamforming training procedures.

Example 123 is the apparatus of Example 122, the one or more beamforming training procedures to include one or more transmit sector sweeps (TXSSs).

Example 124 is the apparatus of Example 123, the one or more beamforming training procedures to include a TXSS of the first TX antenna array and a TXSS of the second TX antenna array.

Example 125 is the apparatus of any of Examples 122 to 124, the one or more beamforming training procedures to include one or more receive sector sweeps (RXSSs).

Example 126 is the apparatus of any of Examples 122 to 125, the one or more beamforming training procedures to include one or more beam refinement phases (BRPs).

Example 127 is the apparatus of Example 126, at least one of the one or more BRPs to comprise transmissions of a plurality of orthogonal training sequences.

Example 128 is the apparatus of any of Examples 126 to 127, at least one of the one or more BRPs to comprise transmission of a BRP feedback frame comprising feedback for multiple TX training sequences.

Example 129 is the apparatus of any of Examples 117 to 128, the first and second TX antenna arrays to comprise steerable phased antenna arrays.

Example 130 is the apparatus of any of Examples 117 to 129, the wireless communication device to comprise a directional multi-gigabit (DMG) station (STA).

Example 131 is the apparatus of any of Examples 117 to 130, the wireless communication device to operate as a personal basic service set control point/access point (PCP/AP).

Example 132 is the apparatus of any of Examples 117 to 131, the MIMO transmission to comprise a transmission via a 60 GHz frequency band MIMO link.

Example 133 is a system, comprising an apparatus according to any of Examples 117 to 132, and at least one radio frequency (RF) transceiver.

Example 134 is the system of Example 133, comprising at least one processor.

Example 135 is the system of any of Examples 133 to 134, comprising at least one RF antenna.

Example 136 is the system of any of Examples 133 to 134, comprising a touchscreen display.

Example 137 is an apparatus, comprising means for identifying a preferred single-input single-output (SISO) antenna array weight vector (AWV) set for a wireless communication device comprising a first receive (RX) antenna array and a second RX antenna array, and means for determining a preferred multiple-input multiple-output (MIMO) AWV pair for the wireless communication device based on the preferred SISO AWV set according to a MIMO AWV selection procedure, the preferred MIMO AWV pair to comprise a first MIMO AWV comprising an AWV for application to the first RX antenna array in conjunction with reception of a MIMO transmission from a remote device and, a second MIMO AWV comprising an AWV for application to the second RX antenna array in conjunction with reception of the MIMO transmission from the remote device.

Example 138 is the apparatus of Example 137, the preferred SISO AWV set to comprise a preferred AWV $w_{11}$ with respect to SISO reception by the first RX antenna array from a first transmit (TX) antenna array of the remote device, a preferred AWV $w_{21}$ with respect to SISO reception by the first RX antenna array from a second TX antenna array of the remote device, a preferred AWV $w_{12}$ with respect to SISO reception by the second RX antenna array from the first TX antenna array of the remote device, and a preferred AWV $w_{22}$ with respect to SISO reception by the second RX antenna array from the second TX antenna array of the remote device.

Example 139 is the apparatus of Example 138, the MIMO AWV selection procedure to comprise selecting $w_{11}$ as the first MIMO AWV and $w_{22}$ as the second MIMO AWV, or selecting $w_{21}$ as the first MIMO AWV and $w_{12}$ as the second MIMO AWV.

Example 140 is the apparatus of any of Examples 137 to 138, the MIMO AWV selection procedure to comprise optimizing channel capacity for communications between the wireless communication device and the remote device according to an interference nulling technique.

Example 141 is the apparatus of any of Examples 137 to 138, the MIMO AWV selection procedure to comprise identifying a preferred channel between the wireless communication device and the remote device, and iteratively maximizing a capacity of a flat fading channel based on the preferred channel.

Example 142 is the apparatus of any of Examples 137 to 141, comprising means for identifying the preferred SISO AWV set by engaging in one or more beamforming training procedures.

Example 143 is the apparatus of Example 142, the one or more beamforming training procedures to include one or more receive sector sweeps (RXSSs).

Example 144 is the apparatus of Example 143, the one or more beamforming training procedures to include an RXSS of the first RX antenna array and an RXSS of the second RX antenna array.

Example 145 is the apparatus of any of Examples 142 to 144, the one or more beamforming training procedures to include one or more transmit sector sweeps (TXSSs).

Example 146 is the apparatus of any of Examples 142 to 145, the one or more beamforming training procedures to include one or more beam refinement phases (BRPs).

Example 147 is the apparatus of Example 146, at least one of the one or more BRPs to comprise transmissions of a plurality of orthogonal training sequences.

Example 148 is the apparatus of any of Examples 146 to 147, at least one of the one or more BRPs to comprise transmission of a BRP feedback frame comprising feedback for multiple TX training sequences.

Example 149 is the apparatus of any of Examples 137 to 148, the first and second RX antenna arrays to comprise steerable phased antenna arrays.

Example 150 is the apparatus of any of Examples 137 to 149, the wireless communication device to comprise a directional multi-gigabit (DMG) station (STA).

Example 151 is the apparatus of any of Examples 137 to 150, the wireless communication device to operate as a personal basic service set control point/access point (PCP/AP).

Example 152 is the apparatus of any of Examples 137 to 151, the MIMO transmission to be received via a 60 GHz frequency band MIMO link.

Example 153 is a system, comprising an apparatus according to any of Examples 137 to 152, and at least one radio frequency (RF) transceiver.

Example 154 is the system of Example 153, comprising at least one processor.

Example 155 is the system of any of Examples 153 to 154, comprising at least one RF antenna.

Example 156 is the system of any of Examples 153 to 155, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a memory circuit; and
a processing circuit to couple with antennas of the apparatus, the processing circuit configured to:
perform multiple-input multiple-output (MIMO) beamforming, the MIMO beamforming comprising:
perform a transmit sector sweep (TXSS) from the antennas of the apparatus to antennas of a wireless communication device;
receive a first feedback from the antennas of the wireless communication device based on a first transmit (TX) antenna of the antennas of the apparatus;
receive a second feedback from the antennas of the wireless communication device based on a second TX antenna of the antennas of the apparatus;
determine preferred single-input single-output (SISO) antenna weight vectors (AWVs) for each combination of the first and second TX antennas of the apparatus and the antennas of the wireless communication device based at least in part on the first feedback and the second feedback; and
determine a preferred MIMO AWV pair for the wireless communication device or for the apparatus based on the preferred SISO AWVs.

2. The apparatus of claim 1, wherein the perform MIMO beamforming further comprises apply the preferred MIMO AWV pair for the apparatus to the first and second TX antennas of the apparatus for transmission of a frame from the apparatus to the wireless communication device.

3. The apparatus of claim 1, the preferred SISO AWVs comprising:
a preferred AWV $v_{11}$ with respect to SISO transmission by the first TX antenna of the apparatus to a first receive (RX) antenna of the antennas of the wireless communication device;
a preferred AWV $v_{12}$ with respect to SISO transmission by the first TX antenna of the apparatus to a second RX antenna of the antennas of the wireless communication device;
a preferred AWV $v_{21}$ with respect to SISO transmission by the second TX antenna of the apparatus to the first RX antenna of the wireless communication device; and
a preferred AWV $v_{22}$ with respect to SISO transmission by the second TX antenna of the apparatus to the second RX antenna of the wireless communication device.

4. The apparatus of claim 1, wherein determination of the preferred MIMO AWV pair for the apparatus comprises determination of the preferred MIMO AWV pair for use in transmission of a frame from the first and second TX antennas of the apparatus to the wireless communication device.

5. The apparatus of claim 3, wherein determination of the preferred MIMO AWV pair for the apparatus comprises determination of the preferred MIMO AWV pair based on the preferred SISO AWVs according to a MIMO AWV selection procedure.

6. The apparatus of claim 5, wherein the MIMO AWV selection procedure comprises:
selecting the preferred AWV Vii as a first MIMO AWV and the preferred AWV $v_{22}$ as a second MIMO AWV; or
selecting the preferred AWV $v_{12}$ as the first MIMO AWV and the preferred AWV $v_{21}$ as the second MIMO AWV.

7. The apparatus of claim 5, wherein the MIMO AWV selection procedure comprises optimizing channel capacity for communications between the apparatus and the wireless communication device according to an interference nulling technique.

8. The apparatus of claim 5, wherein the MIMO AWV selection procedure comprises:
identifying a preferred channel between the apparatus and the wireless communication device; and
iteratively maximizing a capacity of a flat fading channel based on the preferred channel.

9. The apparatus of claim 1, the processing circuit is configured to determine the preferred SISO AWVs by engaging in one or more beamforming training procedures.

10. The apparatus of claim 1, wherein the preferred SISO AWVs comprises:
a preferred AWV $w_{11}$ with respect to SISO reception by a first receive (RX) antenna of the antennas of the wireless communication device from the first transmit (TX) antenna of the apparatus;
a preferred AWV $w_{21}$ with respect to SISO reception by the first RX antenna of the wireless communication device from the second TX antenna of the apparatus;
a preferred AWV $w_{12}$ with respect to SISO reception by a second RX antenna of the antennas of the wireless communication device from the first TX antenna of the apparatus; and
a preferred AWV $w_{22}$ with respect to SISO reception by the second RX antenna of the wireless communication device from the second TX antenna of the apparatus.

11. The apparatus of claim 10, wherein the preferred MIMO AWV pair for the wireless communication device comprises:
selecting the preferred AWV $w_{11}$ as a first MIMO AWV and the preferred AWV $w_{22}$ as a second MIMO AWV; or
selecting the preferred AWV $w_{21}$ as the first MIMO AWV and the preferred AWV $w_{12}$ as the second MIMO AWV.

12. A system, comprising:
the apparatus of claim 1; and
at least one radio frequency (RF) transceiver.

13. At least one non-transitory computer-readable storage medium comprising a set of instructions that, in response to being executed on a computing device of an apparatus, cause the computing device to:
perform multiple-input multiple-output (MIMO) beamforming, the MIMO beamforming comprising:
perform a transmit sector sweep (TXSS) from antennas of the apparatus to antennas of a wireless communication device;
receive a first feedback from the antennas of the wireless communication device based on a first transmit (TX) antenna of the antennas of the apparatus;

receive a second feedback from the antennas of the wireless communication device based on a second TX antenna of the antennas of the apparatus;

determine preferred single-input single-output (SISO) antenna weight vectors (AWVs) for each combination of the first and second TX antennas of the apparatus and the antennas of the wireless communication device based at least in part on the first feedback and the second feedback; and determine a preferred MIMO AWV pair for the wireless communication device or for the apparatus based on the preferred SISO AWVs.

14. The at least one non-transitory computer-readable storage medium of claim 13, wherein the perform MIMO beamforming further comprises: apply the preferred MIMO AWV pair for the apparatus to the first and second TX antennas of the apparatus for transmission of a frame from the apparatus to the wireless communication device.

15. The at least one non-transitory computer-readable storage medium of claim 13, the preferred SISO AWVs comprising:
a preferred AWV $v_{11}$ with respect to SISO transmission by the first TX antenna of the apparatus to a first receive (RX) antenna of the antennas of the wireless communication device;
a preferred AWV $v_{12}$ with respect to SISO transmission by the first TX antenna of the apparatus to a second RX antenna of the antennas of the wireless communication device;
a preferred AWV $v_{21}$ with respect to SISO transmission by the second TX antenna of the apparatus to the first RX antenna of the wireless communication device; and
a preferred AWV $v_{22}$ with respect to SISO transmission by the second TX antenna of the apparatus to the second RX antenna of the wireless communication device.

16. The at least one non-transitory computer-readable storage medium of claim 13, wherein determination of the preferred MIMO AWV pair for the apparatus comprises determination of the preferred MIMO AWV pair for use in transmission of a frame from the first and second TX antennas of the apparatus to the wireless communication device.

17. The at least one non-transitory computer-readable storage medium of claim 15, wherein determination of the preferred MIMO AWV pair for the apparatus comprises determination of the preferred multiple-input MIMO AWV pair based on the preferred SISO AWVs according to a MIMO AWV selection procedure.

18. The at least one non-transitory computer-readable storage medium of claim 17, wherein the MIMO AWV selection procedure comprises:
selecting the preferred AWV $v_{11}$ as a first MIMO AWV and the preferred AWV $v_{22}$ as a second MIMO AWV; or
selecting the preferred AWV $v_{12}$ as the first MIMO AWV and the preferred AWV $v_{21}$ as the second MIMO AWV.

19. The at least one non-transitory computer-readable storage medium of claim 17, wherein the MIMO AWV selection procedure comprises optimizing channel capacity for communications between the apparatus and the wireless communication device according to an interference nulling technique.

20. The at least one non-transitory computer-readable storage medium of claim 17, wherein the MIMO AWV selection procedure comprises:
identifying a preferred channel between the apparatus and the wireless communication device; and
iteratively maximizing a capacity of a flat fading channel based on the preferred channel.

21. The at least one non-transitory computer-readable storage medium of claim 13, wherein the preferred SISO AWV set comprises:
a preferred AWV $w_{11}$ with respect to SISO reception by a first receive (RX) antenna of the antennas of the wireless communication device from the first transmit (TX) antenna of the apparatus;
a preferred AWV $w_{21}$ with respect to SISO reception by the first RX antenna of the wireless communication device from the second TX antenna of the apparatus;
a preferred AWV $w_{12}$ with respect to SISO reception by a second RX antenna of the antennas of the wireless communication device from the first TX antenna of the apparatus; and
a preferred AWV $w_{22}$ with respect to SISO reception by the second RX antenna of the wireless communication device from the second TX antenna of the apparatus.

22. The at least one non-transitory computer-readable storage medium of claim 21, wherein determination of the preferred MIMO AWV pair for the wireless communication device comprises determination of the preferred MIMO AWV pair based on the preferred SISO AWVs according to a MIMO AWV selection procedure, wherein the preferred MIMO AWV pair comprises:
selecting the preferred AWV $w_{11}$ as a first MIMO AWV and the preferred AWV $w_{22}$ as a second MIMO AWV; or
selecting the preferred AWV $w_{21}$ as the first MIMO AWV and the preferred AWV $w_{12}$ as the second MIMO AWV.

23. The at least one non-transitory computer-readable storage medium of claim 22, wherein the MIMO AWV selection procedure comprises optimizing channel capacity for communications between the apparatus and the wireless communication device according to an interference nulling technique.

24. The at least one non-transitory computer-readable storage medium of claim 13, comprising instructions that, in response to being executed on the computing device, cause the computing device to identify the preferred SISO AWV set by engaging in one or more beamforming training procedures.

* * * * *